United States Patent [19]

(12) United States Patent
Chao et al.

(10) Patent No.: US 7,852,866 B2
(45) Date of Patent: Dec. 14, 2010

(54) LOW COMPLEXITY SCHEDULING ALGORITHM FOR A BUFFERED CROSSBAR SWITCH WITH 100% THROUGHPUT

(75) Inventors: H. Jonathan Chao, Holmdel, NJ (US); Shivendra S. Panwar, Freehold, NJ (US); Yanming Shen, Brooklyn, NY (US)

(73) Assignee: Polytechnic Institute of New York Universiity, Brooklyn, NY (US)

( * ) Notice: Subject to any disclaimer, the term of this patent is extended or adjusted under 35 U.S.C. 154(b) by 231 days.

(21) Appl. No.: 11/967,725

(22) Filed: Dec. 31, 2007

(65) Prior Publication Data

US 2008/0175259 A1  Jul. 24, 2008

Related U.S. Application Data

(60) Provisional application No. 60/877,771, filed on Dec. 29, 2006, provisional application No. 60/964,973, filed on Aug. 16, 2007.

(51) Int. Cl.
*H04L 12/56* (2006.01)

(52) U.S. Cl. .................................... 370/412

(58) Field of Classification Search ........................ None
See application file for complete search history.

(56) References Cited

U.S. PATENT DOCUMENTS 7,031,330 B1*   4/2006   Bianchini, Jr. .............. 370/362
2006/0077973 A1*   4/2006   Yoon et al. .................. 370/363

OTHER PUBLICATIONS

Li et al., "Exhaustive Service Matching Algorithms for Input Queued Switches", 2004, IEEE, pp. 253-257.*
Giaccone et al., "Towards Simple, High-performance Schedulers for High-aggregate Bandwidth Switches", 2002, IEEE, pp. 1160-1166.*

* cited by examiner

*Primary Examiner*—Gregory B Sefcheck
*Assistant Examiner*—Joshua Smith
(74) *Attorney, Agent, or Firm*—Straub & Pokotylo; John C. Pokotylo (57) ABSTRACT

Scheduling techniques for use with buffered crossbar switches, without speedup, which can provide 100% throughput are described. Each input/output may keep track of the previously served VOQ/crosspoint buffer. The queue lengths of such VOQs and the queue lengths of VOQs corresponding to a uniform probability selection output (e.g., from a Hamiltonian walk schedule) are used to improve the schedule at each time slot.

30 Claims, 7 Drawing Sheets

LOW COMPLEXITY SCHEDULING ALGORITHM FOR A BUFFERED CROSSBAR SWITCH WITH 100% THROUGHPUT

§1. RELATED APPLICATIONS

This application claims the benefit of: (1) U.S. Provisional Patent Application Ser. No. 60/877,771 (incorporated herein by reference and referred to as "the '771 provisional"), filed on Dec. 29, 2006, titled "PROVIDING 100 PERCENT THROUGHPUT IN A BUFFERED CROSSBAR SWITCH," and listing H. Jonathan CHAO, Shivendra S. PANWAR, and Yanming SHEN as the inventors; and (2) U.S. Provisional Patent App No. 60/964,973 (incorporated herein by reference and referred to as "the '973 provisional"), titled "A LOW COMPLEXITY SCHEDULING ALGORITHM FOR A BUFFERED CROSSBAR SWITCH WITH 100% THROUGHPUT," filed on Aug. 16, 2007, and listing and listing H. Jonathan CHAO, Shivendra S. PANWAR, and Yanming SHEN as the inventors. The present invention in not limited to requirements of the particular embodiments described in the '771 and '973 provisional applications.

§2. GOVERNMENT FUNDING

The U.S. Government might have a paid-up license in this invention and might have the right in limited circumstances to require the patent owner to license others on reasonable terms as provided for by the terms of Award No. 0435303 awarded by the National Science Foundation.

§3. BACKGROUND OF THE INVENTION

§3.1 Field of the Invention

The present invention concerns switches used in data communications networks. In particular, the present invention concerns schedulers used in buffered crosspoint switches.

§3.2 Background Information

With the growing demand of Internet traffic, there is an increasing interest in designing high performance packet switches. Due to memory speed constraints, input queuing, or combined input and output queueing (CIOQ), is used with bufferless crossbar switching fabrics. With input-queueing, at each input port, there is a separate queue corresponding to each output, known as virtual output queues (VOQs). VOQs are used to avoid head-of-line (HOL) blocking. A bufferless crossbar switching fabric is used to transfer cells from inputs to outputs. However, such switches usually require complex scheduling algorithms to achieve good performance, such as maximum weight matching, maximal and maximum size matching, or iterative schedulers. While some schedulers have simpler complexity (e.g., O(log N), where N is the number of ports in the switch), they still suffer from delays that grow with N.

To provide good performance, while addressing the complexity issue of scheduling algorithms, one approach is to add limited buffers inside the crossbar switch fabric. With present application specific integrated circuit ("ASIC") technology, a large amount of memory can be implemented in a single chip. This makes buffered crossbar switches an attractive solution compared to the traditional input-queued switch because of their potentially simpler scheduling algorithms and better delay performance.

A scalable buffered crossbar switch architecture can leverage the opportunities offered by Proximity Communication. (See, e.g., R. Drost, R. D. Hopkins, R. Ho, and I. Sutherland, "Proximity Communication," *IEEE Journal on Solid-State Circuits*, vol. 39, no. 9 (September 2004). (This article is incorporated herein by reference.)) Conventionally, large switch fabrics with hundreds of ports could be constructed only by connecting switch chips in a hierarchical way using a multi-stage topology. With Proximity Communication, there is enough chip-to-chip bandwidth available such that large switch fabrics can be built with a single stage topology. This is done simply by dividing a large crossbar into several smaller crossbars which are then "stitched together" through Proximity Communication. A single-stage switch offers many advantages over a multi-stage switch. Therefore, it is desirable to design a scheduler that can scale up to a large number of ports and make scheduling decisions in the short time given by a high-speed cell-based switch, while achieving 100% throughput at the same time.

With a speedup of two (2), the authors in S- T. Chuang, S. Iyer, and N. McKeown, "Practical Algorithms for Performance Guarantees in Buffered Crossbars," *Proceedings of IEEE Infocom*, Miami, Fla. (March 2005)(incorporated herein by reference) showed that a buffered crossbar can provide guaranteed performance (throughput, rate, delay). In the paper, J. Turner, "Strong Performance Guarantees for Asynchronous Crossbar Schedulers," *Proceedings of IEEE Infocom*, Spain (April 2006)(incorporated herein by reference), the results are extended to variable size packets. The author in M. Berger, "Delivering 100% Throughput in a Buffered Crossbar with Round Robin Scheduling," *Proceedings of IEEE High Performance Switch and Routing*, Poznan, Poland (2006)(incorporated herein by reference) proved that the speedup requirement can be reduced to 2–1/N. However, without speedup, the throughput results are only limited to uniform traffic loads. Under uniform traffic, it has been shown that a simple round-robin scheduler can provide 100% throughput. (See, e.g., T. Javidi, R. Magill, and T. Hrabik, "A High Throughput Scheduling Algorithm for a Buffered Crossbar Switch Fabric," *Proceedings of IEEE International Conference on Communications*, (2001) (Incorporated herein by reference).) In the paper, R. Rojas-Cessa, E. Oki, and H. J. Chao, "On the Combined Input-Crosspoint Buffered Packet Switch with Round-Robin Arbitration," *IEEE Transactions on Communications*, vol. 53, no. 11, pp. 1945-1951 (November 2005)(incorporated herein by reference), the authors proved that the longest-queue-first at the input port and round-robin at the output port (LQF-RR) guaranteed 100% throughput under uniform traffic.

In the paper P. Giaccone, E. Leonardi, and D. Shah, "On the Maximal Throughput of Networks with Finite Buffers and its Application to Buffered Crossbars," *Proceedings of IEEE Infocom*, Miami, Fla. (March 2005)(Incorporated herein by reference), the authors proposed a distributed scheduling algorithm and derived a relationship between throughput and the size of crosspoint buffers. Unfortunately, however, to achieve 100% throughput, the switch described needed an infinite buffer. With current state-of-the-art technology, the total amount of buffers that can be built on chip is limited. For a switch with large number of ports, the buffer size associated with an input-output pair should be kept small.

In the paper, L. Tassiulas, "Linear Complexity Algorithms for Maximum Throughput in Radio Networks and Input Queued Switches," *Proceedings of IEEE INFOCOM* 1998, vol. 2, pp. 533-539, New York, N.Y. (1998) (incorporated herein by reference), the author studied randomized algorithms that achieve 100% throughput for an input-queued switch. The approach works as follows. In each time slot, a feasible solution to the maximum weighted matching problem is obtained. If the value of the new solution is higher than the value of the current solution, the latter is replaced. Using this approach guarantees achieving 100% throughput under the condition that the probability that the new solution is equal to the maximum weight matching is strictly greater than zero. A de-randomized version of this algorithm was proposed in the paper, P. Giaccone, B. Prabhakar, and D. Shah, "Toward Simple, High Performance Schedulers for High-Aggregate Bandwidth Switches," *Proceedings of IEEE INFOCOM*, New York, N.Y. (2002) (incorporated herein by reference), where a Hamiltonian walk is applied instead of randomly generating a new schedule. However, such approaches introduced a large delay. Several approaches have been proposed for input-queued switch to reduce the delay. (See, e.g., P. Giaccone, B. Prabhakar, and D. Shah, "Toward Simple, High Performance Schedulers for High-Aggregate Bandwidth Switches," *Proceedings of IEEE INFOCOM*, New York, N.Y. (2002) (incorporated herein by reference); and Y. Li, S. S. Panwar, and H. J. Chao, "Exhaustive Service Matching Algorithms for Input Queued Switches," *Proceedings of IEEE Workshop on High Performance Switching and Routing* (2004) (incorporated herein by reference).)

In view of the foregoing, improved scheduling techniques would be useful, especially for large scale switches. It would be useful if such techniques had acceptable delay, throughput and hardware attributes.

§4. SUMMARY OF THE INVENTION

Embodiments consistent with the present invention provide a scheduler and scheduling method for use in a buffered crossbar switch having (1) a plurality of output ports, (2) a plurality of input ports, each of the plurality of input ports having a virtual output queue corresponding to each of the plurality of output ports, and (3) a switch fabric coupling each of the input ports with each of the output ports, defining crosspoints and including a buffer in the switch fabric at each input port-output port crosspoint. Such a scheduler or scheduling method may (a) for each input port, select either (A) the previously served virtual output queue, or (B) a virtual output queue corresponding to a uniform probability selection output for a time slot, as a function of queue lengths of the previously served virtual output queues of all of the plurality of input ports and queue lengths of the virtual output queue corresponding to the uniform probability selection output, for all of the plurality of input ports, (b) serve the selected virtual output queue if both (1) the selected virtual output queue is non-empty and (2) the corresponding crosspoint buffer is not full, and otherwise serve another, non-empty, virtual output queue using an alternative selection discipline, (c) for each output port, select either (A) the previously served crosspoint buffer, or (B) a crosspoint buffer corresponding to the uniform probability selection output for the time slot, as a function of queue lengths of the previously served virtual output queues of all of the plurality of input ports and queue lengths of the virtual output queue corresponding to the uniform probability selection output, for all of the plurality of input ports, and (d) serve the selected crosspoint buffer if the selected crosspoint buffer is non-empty, and otherwise serve another, non-empty, crosspoint buffer using an alternative selection discipline.

§6. DETAILED DESCRIPTION

The present invention may involve novel methods, apparatus, message formats, and/or data structures for scheduling the serving of cells in a buffered crossbar switch. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In §6.1 below, an exemplary buffered crossbar switch architecture in which, or with which, embodiments consistent with the present invention may be used, is described. Then, exemplary methods consistent with the present invention are described in §6.2. Thereafter, exemplary apparatus consistent with the present invention are described in §6.3. Refinements, alternatives and extensions of the exemplary embodiments are then described in §6.4. Finally, some conclusions are presented in §6.5.

§6.1 Exemplary Environment—Buffered Crossbar Switch

Figure 1:
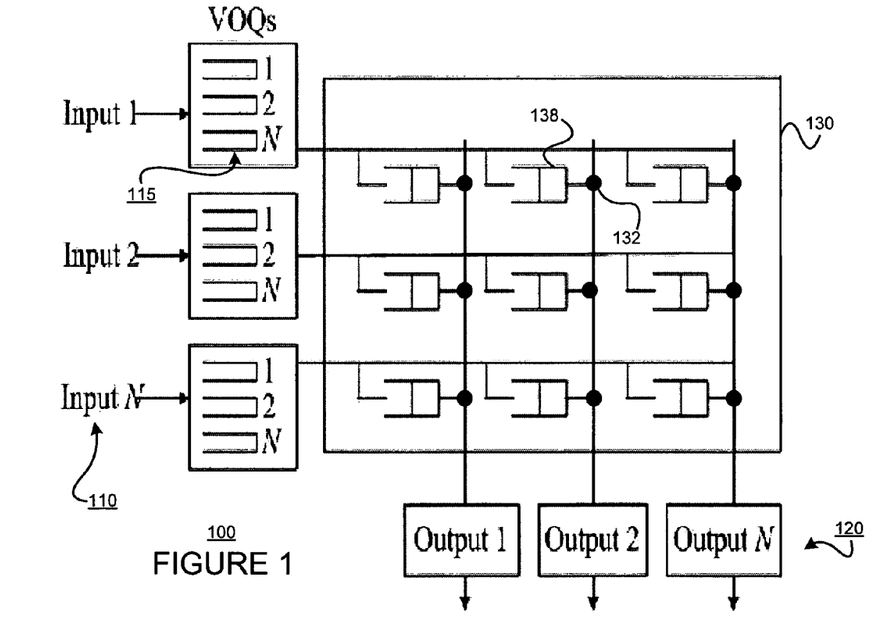
FIG. 1 is a block diagram of a buffered crossbar switch in which each input port has a VOQ corresponding to each of the output ports.

FIG. 1 is a block diagram of an N×N buffered crossbar switch 100 in which each input port 110 has a VOQ 115 corresponding to each of the output ports 120. Fixed size packet (cell) switching is assumed. Variable size packet switching can be implemented by introducing packet segmentation and reassembly. The input ports 110 use VOQs 115 to prevent head-of-line blocking. Specifically, each input port 110 maintains N VOQs 115, one for each output of the N output ports 120. In the following, let $Q_{ij}(n)$ denote the queue length of $VOQ_{ij}(n)$ at time n, n=0,1, . . . , . Although an N×N switch is shown, embodiments consistent with the present invention may be used in switches with different numbers of inputs and outputs.

In the switch fabric 130, each crosspoint 132 contains a finite buffer 138 of size B. In the following, the buffer between input i and output j is denoted as $CB_{ij}$; $B_{ij}(n)$ is the buffer occupancy of $CB_{ij}$ at time n, $B_{ij}(n) \leq B$.

Figure 2:
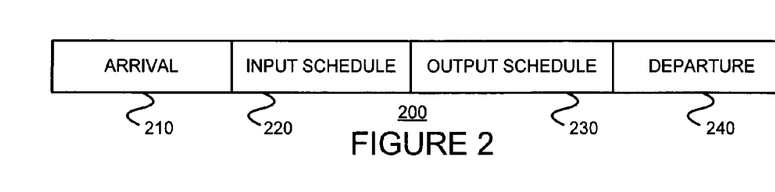
FIG. 2 is a diagram illustrating scheduling phases of a buffered crossbar switch.

The crosspoint buffers 138 function to separate the input contention from the output contention. This allows a two-stage scheduling scheme. Specifically, as shown in FIG. 2, in an input scheduling phase 220, each input port 110 determines which cell is transferred from a VOQ 115 to the corresponding crosspoint buffer 138 with available space. In an output scheduling phase 230, each output port 120 determines from which non-empty crosspoint buffer 138 to serve a cell. Cells arrive at the input ports 110 during arrival phase 210, and cells depart from output ports 120 during departure phase 240.

When a crosspoint buffer 138 is full, no more cells can be transferred to it. Note that if the crosspoint buffer size is unlimited, the buffered crossbar is equivalent to output queuing, and input schedulers are not necessary because packets can directly go to crosspoint buffers without buffering at inputs. For a practical single-chip implementation using current technology, however, the crosspoint buffers are constrained to a small number.

Let $A_{ij}(n)$ be the number of packets that have arrived at input i destined for output j up to time slot n. Assume the arrival process $A_{ij}(n)$, i,j=1, . . . , N satisfies the strong law of large numbers (SLLN), i.e., with probability one, $$\lim_{n \to \infty} \frac{A_{ij}(n)}{n} = \lambda_{ij} \quad i, j = 1, \ldots, N. \quad (1)$$

Definition 1: An arrival process is said to be "admissible" if $$\sum_i \lambda_{ij} \leq 1, \sum_j \lambda_{ij} \leq 1. \quad (2)$$

Let $D_{ij}(n)$ be the number of departures from crosspoint buffer $CB_{ij}$ up to time slot n.

Definition 2: A switch operating under a matching algorithm is "rate stable" if, with probability one, $$\lim_{n \to \infty} \frac{D_{ij}(n)}{n} = \lambda_{ij} \quad i, j = 1, \ldots, N. \quad (3)$$

for any arrival process satisfying condition (1).

Let $X_{ij}(n)$ be the total number of cells in $VOQ_{ij}$ and $CB_{ij}$ at time n, $X_{ij}(n) = Q_{ij}(n) + B_{ij}(n)$, $X(n) = [X_{ij}(n)]$. Let $S(n) = [S^I(n); S^O(n)]$ be the schedule at time n. $S^I(n) = [S_{ij}^I(n)]$ is the input schedule and is subject to the following constraints:

$$\sum_j S_{ij}^I(n) \leq 1, S_{ij}^I(n) = 0 \text{ if } B_{ij}(n) = B; \quad (4)$$

$S^O(n) = [S_{ij}^O(n)]$ is the output schedule and is subject to the following constraints:

$$\sum_i S_{ij}^O(n) \leq 1, S_{ij}^O(n) = 0 \text{ if } B_{ij}(n) = 0; \quad (5)$$

The set of all possible schedules is denoted by Π. For each schedule S∈Π define the weight $W_S(n)$ of a schedule as $W_S(n) = <S^O(n), X(n)>$, where for two matrices A and B of the same size, $<A,B> = \Sigma_{ij} A_{ij} B_{ij}$.

Note that although the weight is calculated with the output schedule only, in fact, the input schedule enters the weight calculation implicitly. FIG. 2 illustrates that the output schedule may be performed after the input schedule. A valid output schedule is determined by the state of crosspoint buffers. This takes place after the input scheduling phase, when the state of crosspoint buffers is updated.

§6.2 Exemplary Scheduling Methods

Figure 4:
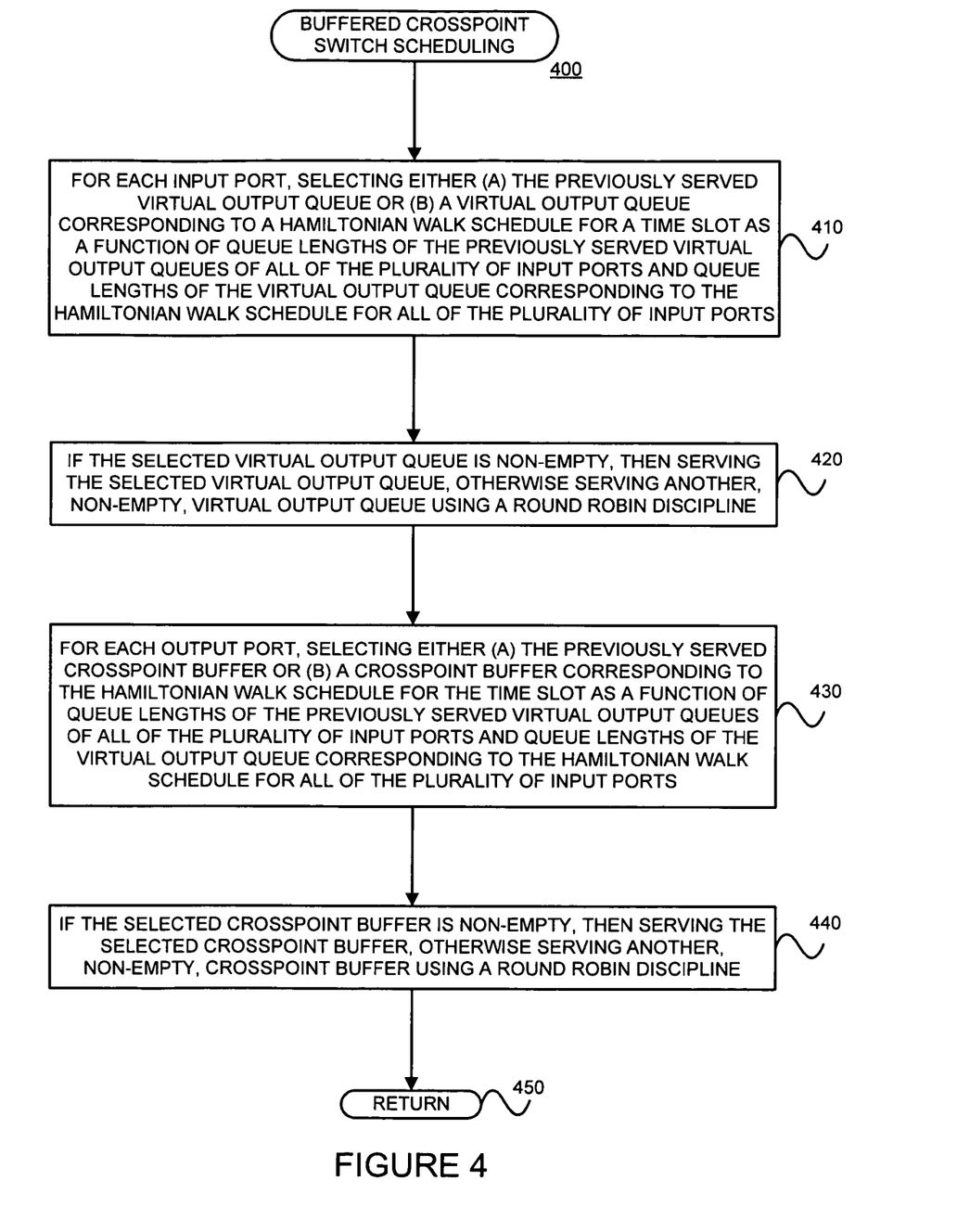
FIG. 4 is a flow diagram of an exemplary scheduling method consistent with the present invention.

A scheduler for crossbar buffered switches consistent with the present invention is now described with reference to FIG. 4. FIG. 4 is a flow diagram of an exemplary scheduling method 400 consistent with the present invention. The scheduling method of FIG. 4 may be used with a buffered crossbar switch having (1) a plurality of output ports, (2) a plurality of input ports, each of the plurality of input ports having a virtual output queue corresponding to each of the plurality of output ports, and (3) a switch fabric coupling each of the input ports with each of the output ports, defining crosspoints and including a buffer in the switch fabric at each input port-output port crosspoint. As shown, for each input port, either (A) the previously served virtual output queue, or (B) a virtual output queue corresponding to a Hamiltonian walk schedule for a time slot is selected as a function of queue lengths of the previously served virtual output queues of all of the plurality of input ports and queue lengths of the virtual output queue corresponding to the Hamiltonian walk schedule for all of the plurality of input ports. (Block 410) If the selected virtual output queue is non-empty and the corresponding crosspoint buffer is not full, then the selected virtual output queue is served; otherwise another, non-empty, virtual output queue selected using a round robin discipline is served. (Block 420) Similarly, for each output port, either (A) the previously served crosspoint buffer or (B) a crosspoint buffer corresponding to the Hamiltonian walk schedule for the time slot is selected as a function of queue lengths of the previously served virtual output queues of all of the plurality of input ports and queue lengths of the virtual output queue corresponding to the Hamiltonian walk schedule for all of the plurality of input ports. (Block 430) If the selected crosspoint buffer is non-empty, then the selected crosspoint buffer is served; otherwise serving another, non-empty, crosspoint buffer selected using a round robin discipline is served.

§6.2.1 First Embodiment: Crosspoint Buffer Size of One

Figure 5:
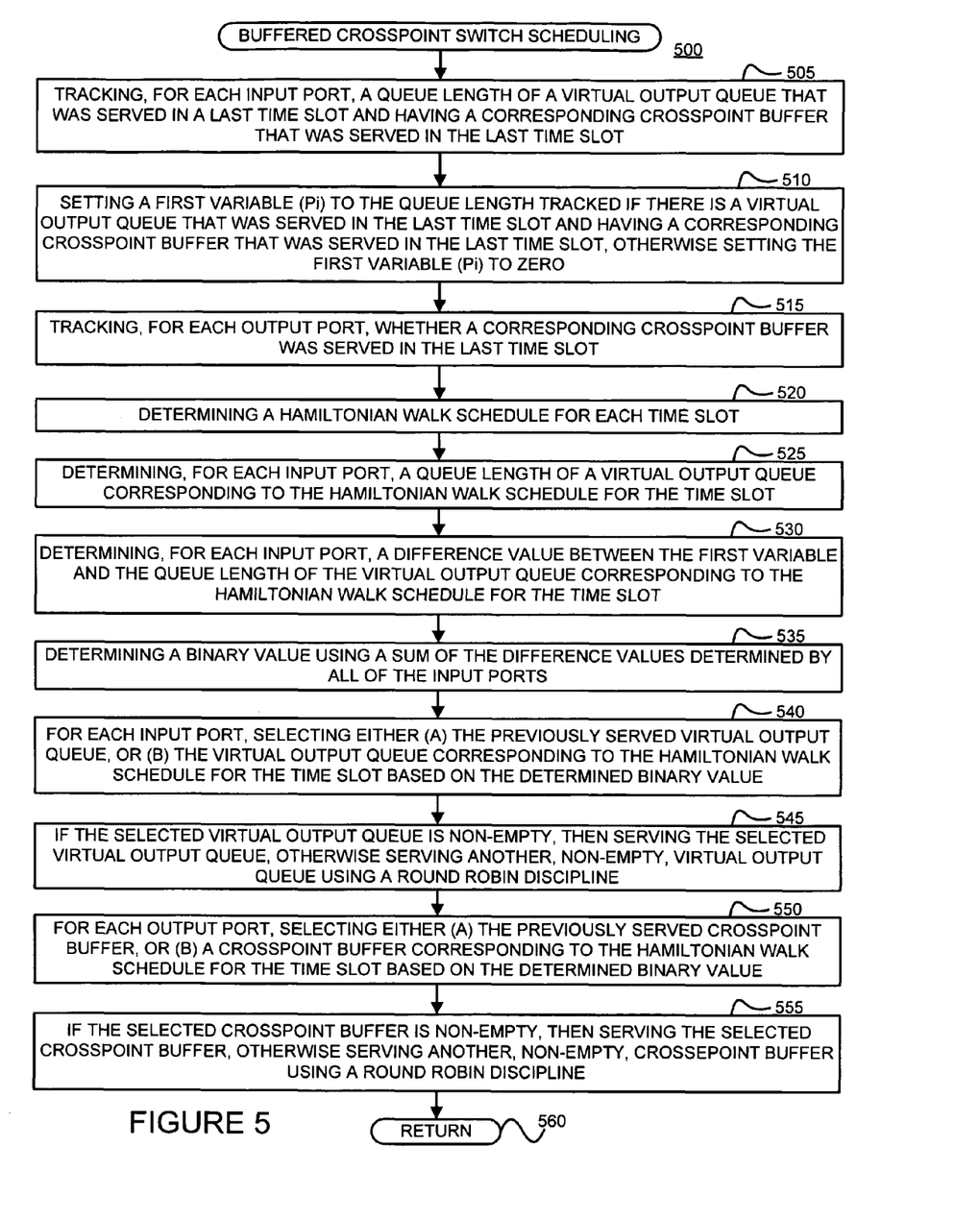
FIG. 5 is a flow diagram of an exemplary scheduling method, consistent with the present invention, for use with a buffered crossbar switch with single-cell buffers at each crosspoint.

FIG. 5 is a flow diagram of an exemplary scheduling method 500, consistent with the present invention, for use with a buffered crossbar switch with a single-cell buffer at each crosspoint. For each input port, a queue length of a virtual output queue that was served in a last time slot and having a corresponding crosspoint buffer that was served in the last time slot is tracked. (Block 505) A first variable (Pi) is set to the queue length tracked if there is a virtual output queue that was served in the last time slot and that has a corresponding crosspoint buffer that was served in the last time slot; otherwise the first variable (Pi) is set to zero. (Block 510) For each output port, whether a corresponding crosspoint buffer was served in the last time slot is tracked. (Block 515).

A Hamiltonian walk schedule for each time slot is determined. (Block 520) Then, for each input port, a queue length of a virtual output queue corresponding to the Hamiltonian walk schedule for the time slot is determined. (Block 525) For each input port, a difference value between the first variable and the queue length of the virtual output queue corresponding to the Hamiltonian walk schedule for the time slot is determined. (Block 530)

A binary value is then determined using a sum of the difference values determined for (e.g., by) all of the input ports. (Block 535) For each input port, either (A) the previously served virtual output queue, or (B) the virtual output queue corresponding to the Hamiltonian walk schedule for the time slot is selected based on the determined binary value. (Block 540) If the selected virtual output queue is non-empty and the corresponding crosspoint buffer is not full, then the selected virtual output queue is served; otherwise another, non-empty, virtual output queue is selected using a round robin discipline and served. (Block 545) Similarly, for each output port, either (A) the previously served crosspoint buffer, or (B) a crosspoint buffer corresponding to the Hamiltonian walk schedule for the time slot is selected based on the determined binary value. (Block 550) If the selected crosspoint buffer is non-empty, then the selected crosspoint buffer is served; otherwise another, non-empty, crosspoint buffer is selected using a round robin discipline and served. (Block 555) The method 500 is then left. (Node 560)

Note that the acts of the method 500 may be repeated for each cell time slot.

Referring back to block 535, in at least some embodiments consistent with the present invention, the act of determining a binary value using a sum of the difference values determined by all of the input ports may be performed by a centralized scheduler.

Referring back to blocks 505, 510, 525, 530, 540 and 545, in at least some embodiments consistent with the present invention, at least some of the acts of (a) tracking, for each input port, a queue length of a virtual output queue that was served in the last time slot and having a corresponding crosspoint buffer that was served in the last time slot, (b) setting a first variable to the queue length tracked if there is a virtual output queue that was served in the last time slot and having a corresponding crosspoint buffer that was served in the last time slot, otherwise setting the first variable to zero, (c) determining, for each input port, a queue length of a virtual output queue corresponding to the Hamiltonian walk schedule for the time slot, (d) determining, for each input port, a difference value between the first variable and the queue length of the virtual output queue corresponding to the Hamiltonian walk schedule for the time slot, (e) for each input port, selecting either (A) the previously served virtual output queue, or (B) the virtual output queue corresponding to the Hamiltonian walk schedule for the time slot based on the determined binary value; and (f) if the selected virtual output queue is non-empty and the corresponding crosspoint buffer is not full, then serving the selected virtual output queue, otherwise serving another, non-empty, virtual output queue using a round robin discipline, may be performed locally, by each input port.

Referring back to blocks 515, 550 and 555, in at least some embodiments consistent with the present invention, at least some of the acts of (a) tracking, for each output port, whether a corresponding crosspoint buffer was served in the last time slot; (b) for each output port, selecting either (A) the previously served crosspoint buffer, or (B) a crosspoint buffer corresponding to the Hamiltonian walk schedule for the time slot based on the determined binary value, and (c) if the selected crosspoint buffer is non-empty, then serving the selected crosspoint buffer, otherwise serving another, non-empty, crosspoint buffer using a round robin discipline, may be performed locally, by each output port.

Referring back to block 520, in at least some embodiments consistent with the claimed invention, the act of determining a Hamiltonian walk schedule for each time slot may be performed by looking up a stored, predetermined, Hamiltonian walk schedule. The predetermined schedule may be stored centrally, or locally (e.g., at each of the input ports and/or each of the output ports). Alternatively, in at least some other embodiments consistent with the claimed invention, the act of determining a Hamiltonian walk schedule may be performed collectively by each of the plurality of input ports and each of the plurality of output ports. In such alternative embodiments, the act of determining a Hamiltonian walk schedule for each time slot may be performed using a finite state machine as a function of the time slot.

Referring to blocks 545 and 555, in at least some embodiments consistent with the present invention, the round robin disciplines can check multiple virtual output queues and multiple crosspoint buffers in a single time slot.

Referring back to block 530, in at least some embodiments consistent with the present invention, the act of determining, for each input port, a difference value between the first variable and the queue length of the virtual output queue corresponding to the Hamiltonian walk schedule for the time slot, may be performed locally by each of the plurality of input ports.

As can be appreciated from the foregoing, each input may keep track of the VOQ which satisfies the following two conditions: (i) the VOQ was served in the last time slot; and (ii) the corresponding crosspoint buffer was served in the last time slot. Such a VOQ may be referred to as a "special" VOQ. Let $p_i$ denote the queue length of such a VOQ for input i. If there is no such VOQ, then $p_i=0$. Similarly, each output keeps track of the crosspoint buffer served in the previous time slot. At each time slot, a Hamiltonian walk schedule is generated or looked up. As is understood by those skilled in the art, a Hamiltonian walk schedule may be a (0,1)-matrix that has exactly one 1 entry in each row and each column and 0's elsewhere. Let $h_i$ be the queue length of the VOQ corresponding to the Hamiltonian walk at input i. In at least some embodiments consistent with the present invention, each input calculates the difference of $d_i=p_i-h_i$, and sends this information to the scheduler. The scheduler calculates the sum of all the differences. It generates a "1" if the sum is positive (or zero) and "0" if the sum is negative. The scheduler then sends back the one-bit information to all input and output ports.

In the exemplary embodiments, each input and output port makes serving decisions (selections) based on this one-bit information. Specifically, if the received one-bit information is a "1", then the input port stays with the previous VOQ served and the output port stays with the previous crosspoint buffer served, but switches to Hamiltonian walk otherwise. However, for each input, if the selected VOQ cannot be served (e.g., if it is empty and/or the corresponding crosspoint buffer is full), then it serves an eligible VOQ in a round-robin order. For each output, if the selected crosspoint buffer is empty, then it serves a non-empty crosspoint buffer in a round-robin order.

§6.2.1 Second Embodiment: Crosspoint Buffer Size of More Than One

Figure 6:
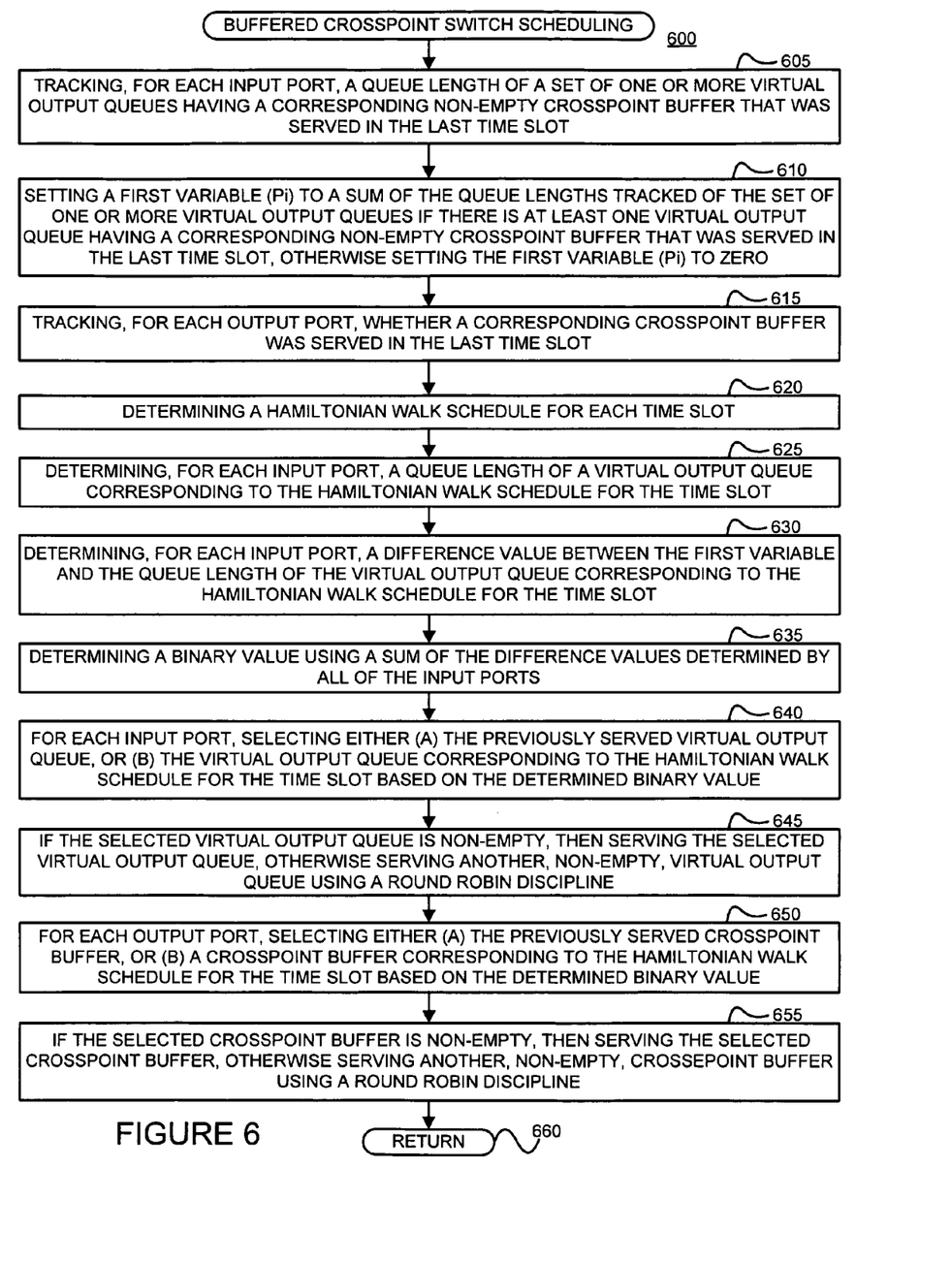
FIG. 6 is a flow diagram of an exemplary scheduling method, consistent with the present invention, for use with a buffered crossbar switch with multi-cell buffers at each crosspoint.

FIG. 6 is a flow diagram of an exemplary scheduling method 600, consistent with the present invention, for use with a buffered crossbar switch with a multi-cell buffer at each crosspoint. For each input port, a queue length of a set of one or more virtual output queues having a corresponding non-empty crosspoint buffer that was served in the last time slot is tracked. (Block 605) A first variable (Pi) is set to a sum of the queue lengths tracked of the set of one or more virtual output queues if there is at least one virtual output queue having a corresponding non-empty crosspoint buffer that was served in the last time slot; otherwise, the first variable (Pi) is set to zero. (Block 610) For each output port, whether a corresponding crosspoint buffer was served in the last time slot is tracked. (Block 615).

A Hamiltonian walk schedule for each time slot is determined. (Block 620) Then, for each input port, a queue length of a virtual output queue corresponding to the Hamiltonian walk schedule for the time slot is determined. (Block 625) Then, for each input port, a difference value between the first variable and the queue length of the virtual output queue corresponding to the Hamiltonian walk schedule for the time slot is determined. (Block 630)

A binary value is then determined using a sum of the difference values determined by all of the input ports. (Block 635) For each input port, either (A) the previously served virtual output queue, or (B) the virtual output queue corresponding to the Hamiltonian walk schedule for the time slot is selected based on the determined binary value. (Block 640) If the selected virtual output queue is non-empty, then the selected virtual output queue is served; otherwise another, non-empty and the corresponding crosspoint buffer is not full, virtual output queue is selected using a round robin discipline and served. (Block 645) Similarly, for each output port, either (A) the previously served crosspoint buffer, or (B) a crosspoint buffer corresponding to the Hamiltonian walk schedule for the time slot is selected based on the determined binary value. (Block 650) If the selected crosspoint buffer is non-empty, then the selected crosspoint buffer is served; otherwise another, non-empty, crosspoint buffer is selected using a round robin discipline and served. (Block 655) The method 500 is then left. (Node 660)

Note that the acts of the method 600 may be repeated for each cell time slot.

Referring back to block 635, in at least some embodiments consistent with the present invention, the act of determining a binary value using a sum of the difference values determined by all of the input ports may be performed by a centralized scheduler.

Referring back to blocks 605, 610, 625, 630, 640 and 645, in at least some embodiments consistent with the present invention, at least some of the acts of (a) tracking, for each input port, a queue length of a set of one or more virtual output queues having a corresponding non-empty crosspoint buffer that was served in the last time slot, (b) setting a first variable (Pi) to a sum of the queue lengths tracked of the set of one or more virtual output queues if there is at least one virtual output queue having a corresponding non-empty crosspoint buffer that was served in the last time slot, otherwise setting the first variable (Pi) to zero, (c) determining, for each input port, a queue length of a virtual output queue corresponding to the Hamiltonian walk schedule for the time slot, (d) determining, for each input port, a difference value between the first variable and the queue length of the virtual output queue corresponding to the Hamiltonian walk schedule for the time slot, (e) for each input port, selecting either (A) the previously served virtual output queue, or (B) the virtual output queue corresponding to the Hamiltonian walk schedule for the time slot based on the determined binary value; and (f) if the selected virtual output queue is non-empty and the corresponding crosspoint buffer is not full, then serving the selected virtual output queue, otherwise serving another, non-empty, virtual output queue using a round robin discipline, may be performed locally, by each input port.

Referring back to blocks 615, 650 and 655, in at least some embodiments consistent with the present invention, at least some of the acts of (a) tracking, for each output port, whether a corresponding crosspoint buffer was served in the last time slot; (b) for each output port, selecting either (A) the previously served crosspoint buffer, or (B) a crosspoint buffer corresponding to the Hamiltonian walk schedule for the time slot based on the determined binary value, and (c) if the selected crosspoint buffer is non-empty, then serving the selected crosspoint buffer, otherwise serving another, non-empty, crosspoint buffer using a round robin discipline, may be performed locally, by each output port.

Referring back to block 620, in at least some embodiments consistent with the claimed invention, the act of determining a Hamiltonian walk schedule for each time slot may be performed by looking up a stored, predetermined, Hamiltonian walk schedule. The predetermined schedule may be stored centrally, or locally (e.g., at each of the input ports and/or each of the output ports). Alternatively, in at least some other embodiments consistent with the claimed invention, the act of determining a Hamiltonian walk schedule may be performed collectively by each of the plurality of input ports and each of the plurality of output ports. In such alternative embodiments, the act of determining a Hamiltonian walk schedule for each time slot may be performed using a finite state machine as a function of the time slot.

Referring to blocks 645 and 655, in at least some embodiments consistent with the present invention, the round robin disciplines can check multiple virtual output queues and multiple crosspoint buffers in a single time slot.

Referring back to block 630, in at least some embodiments consistent with the present invention, the act of determining, for each input port, a difference value between the first variable and the queue length of the virtual output queue corresponding to the Hamiltonian walk schedule for the time slot, may be performed locally by each of the plurality of input ports.

As can be appreciated from the foregoing, when the crosspoint buffer size is more than one, as compared to the case of size one, how each input obtains $p_i$ is different. Let $p_i$ denote the set of VOQs for input i for which both the following statements are true: (i) the corresponding crosspoint buffer was served in the last time slot and (ii) the corresponding crosspoint buffer is not empty in the current time slot. There may be multiple such VOQs for a particular input port. Let $p_i$ denote the sum of queue lengths for such VOQs for input i, $p_i = \Sigma_{j \in P_i} Q_{ij}$. If there is no such VOQ, then $p_i = 0$.

§6.3 Exemplary Apparatus

Embodiments consistent with the present invention might be implemented in hardware, such as one or more field programmable gate arrays (FPGAs), one or more integrated circuits such as an application specific integrated circuit (ASICs), one or more network processors, etc. Alternatively, or in addition, embodiments consistent with the present invention might be implemented as stored program instructions executed by a processor.

Such hardware and/or software might be provided in an addressed data (e.g., packet, cell, etc.) forwarding device (e.g., a switch, a router, etc.).

Figure 3:
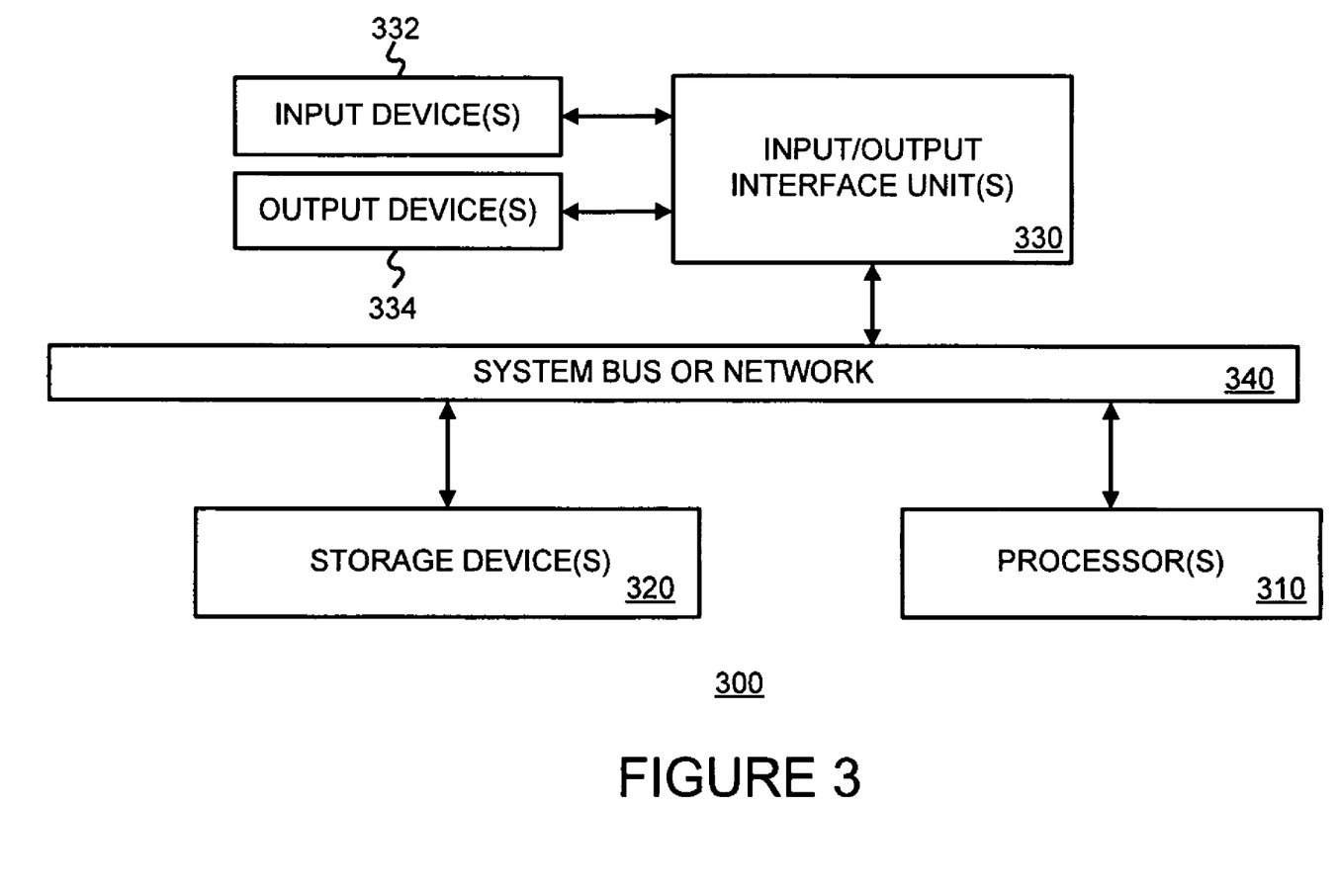
FIG. 3 is a block diagram of an exemplary apparatus that may perform various operations, and store various information generated and/or used by such operations, in a manner consistent with the present invention.

FIG. 3 is high-level block diagram of an exemplary machine 300 that may perform one or more of the processes described above, and/or store information used and/or generated by such processes. The exemplary machine 300 basically includes one or more processors 310, one or more input/output interface units 330, one or more storage devices 320, and one or more system buses and/or networks 340 for facilitating the communication of information among the coupled elements. One or more input devices 332 and one or more output devices 334 may be coupled with the one or more input/output interfaces 330. The one or more processors 310 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 320 and/or may be received from an external source via one or more input interface units 330.

In some embodiments consistent with the present invention, the processing units 310 may be one or more microprocessors. The bus 340 may include a system bus. The storage devices 320 may include system memory, such as read only memory (ROM) and/or random access memory (RAM). The storage devices 320 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

§6.4 Refinements, Alternatives and Extensions

Figure 7:
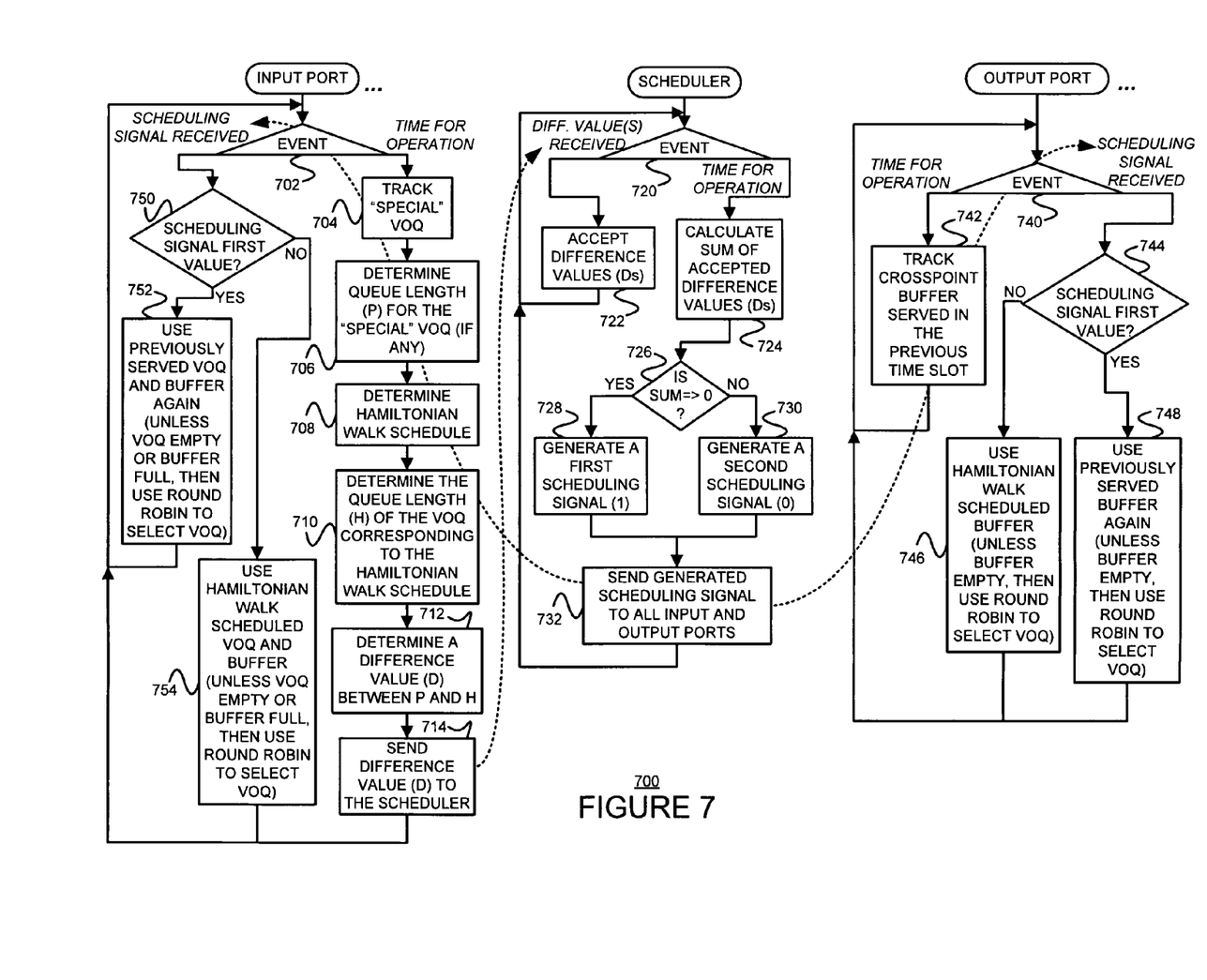
FIG. 7 is a flow diagram of an exemplary scheduling method, as distributed across a plurality of input ports, a centralized scheduler, and a plurality of output ports, consistent with the present invention, for use with a buffered crossbar switch with single-cell buffers at each crosspoint.

FIG. 7 is a flow diagram of an exemplary scheduling method 700, as distributed across a plurality of input ports, a centralized scheduler, and a plurality of output ports, consistent with the present invention, for use with a buffered crossbar switch with single-cell buffers at each crosspoint. At the left side of FIG. 7, an input port portion of the method 700 may be performed by each of a plurality of input ports, and at the right side of FIG. 7, an output port portion of the method 700 may be performed by each of a plurality of output ports. At the center of FIG. 7, a scheduler portion of the method 700 may be performed centrally.

Referring first to the input port potion of the method 700, different branches of this portion of the method may be performed in response to the occurrence of different events. (Block 702) At a time for operations (e.g., at the start of a time slot), a special VOQ (i.e., the VOQ which satisfies the following two conditions: (i) the VOQ was served in the last time slot; and (ii) the corresponding crosspoint buffer was served in the last time slot) may be tracked (Block 704) and a queue length (P) of the special VOQ (if any) is determined (Block 706). A Hamiltonian walk schedule is also determined (Block 708), and a queue length (H) of a corresponding VOQ is determined (Block 710). Finally, a difference value (D) between the determined queue lengths P and H is determined (Block 712) and sent to the scheduler (Block 714)

Referring briefly to the output port portion of the method 700, different branches of this portion of the method may be performed in response to the occurrence of different events. (Block 740) At a time for operations (e.g., at the start of a time slot), a crosspoint buffer that was served in the previous time slot may be tracked (e.g., so see if it is empty or non-empty). (Block 742)

Referring now to the scheduler portion of the method 700, different branches of this portion may be performed in response to the occurrence of different events. (Block 720) When difference value(s) D are received from various input ports, they are accepted and saved. (Block 722) Referring back to block 720, when it is time for operations, a sum of the accepted difference values is determined. (Block 724) If the sum is at least 0, a first scheduling signal value (e.g., 1) is generated. (Blocks 726 and 728). Otherwise, a second scheduling signal value (e.g., 0) is generated. (Blocks 726 and 730) In either case, the generated scheduling signal is sent to all input and output ports. (Block 732)

Referring first back to event block 702, when an input port receives the scheduling signal, if the scheduling signal is the first value (e.g., 1), then a previously served VOQ and buffer is served again (unless the VOQ is empty or the buffer is full, in which case a round robin discipline is used to serve another non-empty VOQ (with a non-full buffer)). (Blocks 750 and 752) If, on the other hand, the scheduling signal is the second value (e.g., 0), then the VOQ and buffer associated with the Hamiltonian walk schedule is served (unless the VOQ is empty or the buffer is full, in which case a round robin discipline is used to serve another non-empty VOQ (with a non-full buffer)). (Blocks 750 and 754)

Referring now back to event block 740, when an output port receives the scheduling signal, if the scheduling signal is the first value (e.g., 1), then a previously served buffer is served again (unless the buffer is empty, in which case a round robin discipline is used to serve another non-empty buffer). (Blocks 744 and 748) If, on the other hand, the scheduling signal is the second value (e.g., 0), then a buffer associated with a Hamiltonian walk schedule is served (unless the buffer is empty, in which case a round robin discipline is used to serve another non-empty buffer). (Blocks 744 and 746)

Referring back to block 708, although an input port was described as determining a Hamiltonian walk schedule, this may be (A) determined centrally and communicated to each of the input and/or output ports, (B) determined centrally and stored at each of the input and/or output ports, or (C) determined distributedly at each of the input ports and/or each of the output ports.

Referring back to FIG. 2, in at least some embodiments consistent with the present invention, scheduling and serving cells (or any of the phases shown) can be pipelined so that two or more phases may be performed in parallel, one phase at one time slot and another phase at another time slot.

In various embodiments consistent with the claimed invention, each slot has two message exchanges. First, each input sends the queue length difference information to the scheduler. Second, the scheduler sends one bit information to all inputs/outputs. Let $d_{max}$ denote the maximum queue length difference among all input ports. As can be appreciated, totally up to log $d_{max}$+1 (sign) bits need to be sent to the scheduler from each input port. The number of bits sent by the scheduler to inputs/outputs is 1. Therefore, the total bits exchanged with each line card in each time slot is at most 2+log$d_{max}$. This reduces the communication overhead significantly as compared with that described in the '771 provisional, in which each input needs to send the information of N VOQ lengths to output ports, up to N log $d_{max}$ bits.

For N inputs, the scheduler only needs to calculate the sum of N variables, and can therefore be implemented with a time complexity of log N. The Hamiltonian walk is deterministic and has a complexity of O(1). The time complexity for each input/output remembering the last served queue is also O(1). Therefore, the total complexity of at least some embodiments consistent with the present invention is O(log N).

This technique described in the '771 provisional can be applied to a buffered crossbar switch to achieve 100% throughput as well. With buffers at crosspoints, we can reduce the complexity significantly, and at the same time achieve a much better delay performance. The '771 provisional describes a 100% throughput scheduling technique called "SQUISH" (Stable QUeue Input-output Scheduler with Hamiltonian walk). With SQUISH, a buffered crossbar switch can achieve 100% throughput without speedup and a finite crosspoint buffer size.

Although exemplary embodiments described above used a Hamiltonian walk schedule to determine a VOQ as a candidate for selection along with the previously served VOQ, in at least some alternative embodiments consistent with the present invention, alternative scheduling techniques for selecting a VOQ and crosspoint buffer combination with a uniform probability may be used. For example, since a randomly generated schedule has a uniform selection probability, it may be used instead of a Hamiltonian walk schedule. Similarly, a pseudo-random schedule, which is predetermined and stored, may be used instead of a Hamiltonian walk schedule. In either alternative, the probability that the random schedule is the maximum weight matching should be non-zero.

Although exemplary embodiments described above used a round robin discipline to (1) serve an alternative VOQ if a selected VOQ is empty or if a corresponding crosspoint buffer is full, and (2) to serve an alternative crosspoint buffer if a selected crosspoint buffer is empty, in at least some alternative embodiments consistent with the present invention, alternative schemes may be used in one or both cases. Examples of alternative schemes include random, longest (e.g., fullest) VOQ, longest (e.g., fullest) crosspoint buffer, etc.

Figure 8:
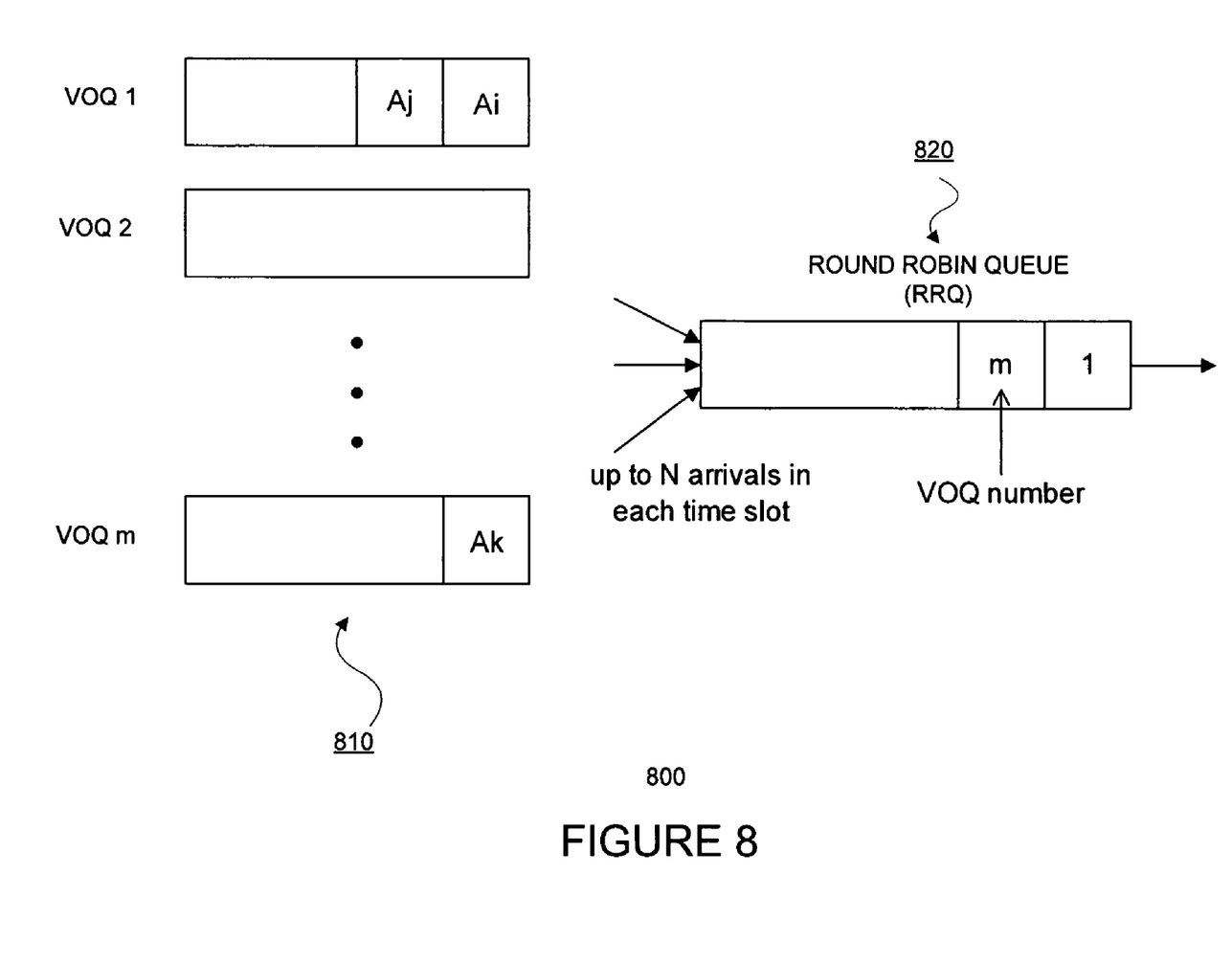
FIG. 8 is a block diagram of such an implementation of a round robin packet scheduler.

In some embodiments consistent with the present invention, the round robin selection discipline may be implemented with an architecture to ensure fast operation. FIG. 8 is a block diagram of such an implementation of a round robin packet scheduler 800 for a switch having m VOQs 810 and one round-robin queue (RRQ) 820. In the exemplary implementation, each VOQ storing cells' address has only one VOQ number in the RRQ. There can be up to N cells arriving in each cell time slot. When a cell arrives at an empty VOQ, its VOQ value is inserted to the tail of the RRQ. The RRQ chooses the head-of-line (HOL) VOQ value and sends its HOL cell. As soon as a cell is served, its VOQ is checked to determine if there is any remaining cell. If yes, there is one or more remaining cells, the VOQ value is inserted to the tail of the RRQ, otherwise nothing is done. Since there can be up to N cells arriving and one cell departing in each time slot, up to N+1 VOQ values can be inserted to the tail of the RRQ.

§6.5 CONCLUSION

As can be appreciated from the foregoing, embodiments consistent with the present invention can provide scheduling for buffered crossbar switches with a crosspoint buffer size as small as one and no speedup. The complexity of some embodiments is O(log N). When such scheduling is used, a buffered crossbar switch can achieve 100% throughput under any admissible input traffic satisfying the strong law of large numbers. Simulation studies indicate that for most realistic traffic scenarios, the delay performance of such embodiments is close to that of an ideal output-queued switch. Moreover, the average delay does not increase with the switch size, as has been observed for an input-queued switch. Consequently, embodiments consistent with the present invention provide scalable delay performance and are suitable for large-scale switches.

What is claimed is:

1. For use in a buffered crossbar switch having
   a plurality of output ports,
   a plurality of input ports, each of the plurality of input ports having a virtual output queue corresponding to each of the plurality of output ports, and
   a switch fabric coupling each of the input ports with each of the output ports, defining crosspoints and including a buffer in the switch fabric at each input port-output port crosspoint,
   a scheduling method comprising:
   a) for each input port, selecting either (A) the previously served virtual output queue, or (B) a virtual output queue corresponding to a uniform probability selection output for a time slot, as a function of queue lengths of the previously served virtual output queues of all of the plurality of input ports and queue lengths of the virtual output queue corresponding to the uniform probability selection output, for all of the plurality of input ports;
   b) if both (1) the selected virtual output queue is non-empty and (2) the corresponding crosspoint buffer is not full, then serving the selected virtual output queue, otherwise serving another, non-empty, virtual output queue with a corresponding non-full crosspoint buffer, using an alternative selection discipline;
   c) for each output port, selecting either (A) the previously served crosspoint buffer, or (B) a crosspoint buffer corresponding to the uniform probability selection output for the time slot, as a function of queue lengths of the previously served virtual output queues of all of the plurality of input ports and queue lengths of the virtual output queue corresponding to the uniform probability selection output, for all of the plurality of input ports; and
   d) if the selected crosspoint buffer is non-empty, then serving the selected crosspoint buffer, otherwise serving another, non-empty, crosspoint buffer using an alternative selection discipline.

2. The method of claim 1 wherein each crosspoint buffer is a single cell buffer, and
   wherein the act of selecting, for each input port, either (A) the previously served virtual output queue, or (B) a virtual output queue corresponding to a uniform probability selection output for a time slot, as a function of queue lengths of the previously served virtual output queues of all of the plurality of input ports and queue lengths of the virtual output queue corresponding to the uniform probability selection output, for all of the plurality of input ports includes
   1) tracking, for each input port, a queue length of a virtual output queue that was served in a last time slot and having a corresponding crosspoint buffer that was served in the last time slot,
   2) setting a first variable to the queue length tracked if there is a virtual output queue that was served in the last time slot and having a corresponding crosspoint buffer that was served in the last time slot, otherwise setting the first variable to zero,
   3) determining a uniform probability selection output for each time slot,
   4) determining, for each input port, a queue length of a virtual output queue corresponding to the uniform probability selection output for the time slot,
   5) determining, for each input port, a difference value between the first variable and the queue length of the virtual output queue corresponding to the uniform probability selection output for the time slot, 6) determining a binary value using a sum of the difference values determined by all of the input ports, and
7) for each input port, selecting either (A) the previously served virtual output queue, or (B) the virtual output queue corresponding to the uniform probability selection output for the time slot based on the determined binary value.

3. The method of claim 2 wherein the act of selecting, for each output port, selecting either (A) the previously serve crosspoint buffer, or (B) a crosspoint buffer corresponding to the uniform probability selection output for the time slot, as a function of queue lengths of the previously served virtual output queues of all of the plurality of input ports and queue lengths of the virtual output queue corresponding to the uniform probability selection output for all of the plurality of input ports, includes
1) tracking, for each output port, whether a corresponding crosspoint buffer was served in the last time slot, and
2) for each output port, selecting either (A) the previously served crosspoint buffer, or (B) a crosspoint buffer corresponding to the uniform probability selection output for the time slot based on the determined binary value.

4. The method of claim 2 wherein the act of determining a binary value using a sum of the difference values determined by all of the input ports is performed by a centralized scheduler.

5. The method of claim 2 wherein the acts of
tracking, for each input port, a queue length of a virtual output queue that was served in the last time slot and having a corresponding crosspoint buffer that was served in the last time slot,
setting a first variable to the queue length tracked if there is a virtual output queue that was served in the last time slot and having a corresponding crosspoint buffer that was served in the last time slot, otherwise setting the first variable to zero,
determining, for each input port, a queue length of a virtual output queue corresponding to the uniform probability selection output for the time slot,
determining, for each input port, a difference value between the first variable and the queue length of the virtual output queue corresponding to the uniform probability selection output for the time slot,
for each input port, selecting either (A) the previously served virtual output queue, or (B) the virtual output queue corresponding to the uniform probability selection output for the time slot based on the determined binary value, and
if both (1) the selected virtual output queue is non-empty and (2) the corresponding crosspoint buffer is not full, then serving the selected virtual output queue, otherwise serving another, non-empty, virtual output queue using an alternative selection discipline,
are performed locally by each input port.

6. The method of claim 3 wherein the acts of
tracking, for each output port, whether a corresponding crosspoint buffer was served in the last time slot,
for each output port, selecting either (A) the previously served crosspoint buffer, or (B) a crosspoint buffer corresponding to the uniform probability selection output for the time slot based on the determined binary value, and
if the selected crosspoint buffer is non-empty, then serving the selected crosspoint buffer, otherwise serving another, non-empty, crosspoint buffer using an alternative selection discipline,
are performed locally by each output port.

7. The method of claim 2 wherein the act of determining a uniform probability selection output for each time slot is performed by at least one of (A) looking up a stored, predetermined, Hamiltonian walk schedule, (B) computing a Hamiltonian walk schedule output, (C) looking up a stored, predetermined, pseudo-random schedule, and (D) computing a random output.

8. The method of claim 2 wherein the act of determining a uniform probability selection output is performed collectively by each of the plurality of input ports and each of the plurality of output ports.

9. The method of claim 2 wherein the act of determining a uniform probability selection output for each time slot is performed using a finite state machine as a function of the time slot.

10. The method of claim 2 wherein the act of determining a uniform probability selection output for each time slot is performed using a finite state machine as a function of the time slot at each of the plurality of input ports and at each of the plurality of output ports.

11. The method of claim 3 wherein the acts of serving and scheduling are pipelined such that scheduling and serving can occur in the same time slot.

12. The method of claim 11 wherein the alternative selection can check multiple virtual output queues and multiple crosspoint buffers in a single time slot.

13. The method of claim 2 wherein the act of determining, for each input port, a difference value between the first variable and the queue length of the virtual output queue corresponding to the uniform probability selection output for the time slot, is performed locally by each of the plurality of input ports.

14. The method of claim 1 wherein a delay characteristic of the switch is independent of switch size.

15. The method of claim 1 wherein each crosspoint buffer is a multi-cell buffer, and
wherein the act of selecting, for each input port, either (A) the previously served virtual output queue, or (B) a virtual output queue corresponding to a uniform probability selection output for a time slot, as a function of queue lengths of the previously served virtual output queues of all of the plurality of input ports and queue lengths of the virtual output queue corresponding to the uniform probability selection output, for all of the plurality of input ports includes
1) tracking, for each input port, a queue length of a set of one or more virtual output queues having a corresponding non-empty crosspoint buffer that was served in the last time slot,
2) setting a first variable to a sum of the queue lengths tracked of the set of one or more virtual output queues if there is at least one virtual output queue having a corresponding non-empty crosspoint buffer that was served in the last time slot, otherwise setting the first variable to zero,
3) determining a uniform probability selection output for each time slot,
4) determining, for each input port, a queue length of a virtual output queue corresponding to the uniform probability selection output for the time slot,
5) determining, for each input port, a difference value between the first variable and the queue length of the virtual output queue corresponding to the uniform probability selection output for the time slot,
6) determining a binary value using a sum of the difference values determined by all of the input ports, and 7) for each input port, selecting either (A) the previously served virtual output queue, or (B) the virtual output queue corresponding to the uniform probability selection output for the time slot based on the determined binary value.

16. The method of claim 15 wherein the act of selecting, for each output port, either (A) the previously serve crosspoint buffer, or (B) a crosspoint buffer corresponding to the uniform probability selection output for the time slot, as a function of queue lengths of the previously served virtual output queues of all of the plurality of input ports and queue lengths of the virtual output queue corresponding to the uniform probability selection output, for all of the plurality of input ports, includes
1) tracking, for each output port, whether a corresponding crosspoint buffer was served in the last time slot, and
2) for each output port, selecting either (A) the previously served crosspoint buffer, or (B) a crosspoint buffer corresponding to the uniform probability selection output for the time slot based on the determined binary value.

17. The method of claim 15 wherein the act of determining a binary value using a sum of the difference values determined by all of the input ports is performed by a centralized scheduler.

18. The method of claim 15 wherein the acts of
tracking, for each input port, a queue length of a set of one or more virtual output queues having a corresponding non-empty crosspoint buffer that was served in the last time slot,
setting a first variable to a sum of the queue lengths tracked of the set of one or more virtual output queues if there is at least one virtual output queue having a corresponding non-empty crosspoint buffer that was served in the last time slot, otherwise setting the first variable to zero,
determining a uniform probability selection output for each time slot,
determining, for each input port, a queue length of a virtual output queue corresponding to the uniform probability selection output for the time slot,
determining, for each input port, a difference value between the first variable and the queue length of the virtual output queue corresponding to the uniform probability selection output for the time slot, and
for each input port, selecting either (A) the previously served virtual output queue, or (B) the virtual output queue corresponding to the uniform probability selection output for the time slot based on the determined binary value,
are performed locally by each input port.

19. The method of claim 16 wherein the acts of
tracking, for each output port, whether a corresponding crosspoint buffer was served in the last time slot,
for each output port, selecting either (A) the previously served crosspoint buffer, or (B) a crosspoint buffer corresponding to the uniform probability selection output for the time slot based on the determined binary value, and
if the selected crosspoint buffer is non-empty, then serving the selected crosspoint buffer, otherwise serving another, non-empty, crosspoint buffer using an alternative selection discipline,
are performed locally by each output port.

20. The method of claim 15 wherein the act of determining a uniform probability selection output for each time slot is performed by at least one of (A) looking up a stored, predetermined, Hamiltonian walk schedule, (B) computing a Hamiltonian walk schedule output, (C) looking up a stored, predetermined, pseudo-random schedule, and (D) computing a random output.

21. The method of claim 15 wherein the act of determining a uniform probability selection output is performed collectively by each of the plurality of input ports and each of the plurality of output ports.

22. The method of claim 15 wherein the act of determining a uniform probability selection output for each time slot is performed using a finite state machine as a function of the time slot.

23. The method of claim 15 wherein the act of determining a uniform probability selection output for each time slot is performed using a finite state machine as a function of the time slot at each of the plurality of input ports and at each of the plurality of output ports.

24. The method of claim 16 wherein the acts of serving and scheduling are pipelined such that scheduling and serving can occur in the same time slot.

25. The method of claim 24 wherein the alternative selection discipline can check multiple virtual output queues and multiple crosspoint buffers in a single time slot.

26. The method of claim 15 wherein the act of determining, for each input port, a difference value between the first variable and the queue length of the virtual output queue corresponding to the uniform probability selection output for the time slot, is performed locally by each of the plurality of input ports.

27. The method of claim 1 wherein the alternative selection discipline is one of (A) a round robin selection discipline, (B) selecting a most full virtual output queue, and (C) selecting a most full crosspoint buffer.

28. For use in a buffered crossbar switch having
a plurality of output ports,
a plurality of input ports, each of the plurality of input ports having a virtual output queue corresponding to each of the plurality of output ports, and
a switch fabric coupling each of the input ports with each of the output ports, defining crosspoints and including a buffer in the switch fabric at each input port-output port crosspoint,
a scheduling processor programmed to:
a) select, for each input port, either (A) the previously served virtual output queue, or (B) a virtual output queue corresponding to a uniform probability selection output for a time slot, as a function of queue lengths of the previously served virtual output queues of all of the plurality of input ports and queue lengths of the virtual output queue corresponding to the uniform probability selection output, for all of the plurality of input ports;
b) serve the selected virtual output queue if both (1) the selected virtual output queue is non-empty and (2) the corresponding crosspoint buffer is not full, otherwise serving another, non-empty, virtual output queue with a corresponding non-full crosspoint buffer, using an alternative selection discipline;
c) select, for each output port, either (A) the previously served crosspoint buffer, or (B) a crosspoint buffer corresponding to the uniform probability selection output for the time slot, as a function of queue lengths of the previously served virtual output queues of all of the plurality of input ports and queue lengths of the virtual output queue corresponding to the uniform probability selection output, for all of the plurality of input ports; and d) serve the selected crosspoint buffer if the selected crosspoint buffer is non-empty, otherwise serving another, non-empty, crosspoint buffer using an alternative selection discipline.

29. The scheduler of claim 28 wherein each crosspoint buffer is a single cell buffer, and
wherein the act of selecting by the programmed scheduling processor, for each input port, either (A) the previously served virtual output queue, or (B) a virtual output queue corresponding to a uniform probability selection output for a time slot, as a function of queue lengths of the previously served virtual output queues of all of the plurality of input ports and queue lengths of the virtual output queue corresponding to the uniform probability selection output, for all of the plurality of input ports includes
  1) tracking, for each input port, a queue length of a virtual output queue that was served in a last time slot and having a corresponding crosspoint buffer that was served in the last time slot,
  2) setting a first variable to the queue length tracked if there is a virtual output queue that was served in the last time slot and having a corresponding crosspoint buffer that was served in the last time slot, otherwise setting the first variable to zero,
  3) determining a uniform probability selection output for each time slot,
  4) determining, for each input port, a queue length of a virtual output queue corresponding to the uniform probability selection output for the time slot,
  5) determining, for each input port, a difference value between the first variable and the queue length of the virtual output queue corresponding to the uniform probability selection output for the time slot,
  6) determining a binary value using a sum of the difference values determined by all of the input ports, and
  7) selecting, for each input port, either (A) the previously served virtual output queue, or (B) the virtual output queue corresponding to the uniform probability selection output for the time slot based on the determined binary value.

30. The scheduler of claim 28 wherein each crosspoint buffer is a multi-cell buffer, and
wherein the act of selecting by the programmed scheduling processor, for each input port, either (A) the previously served virtual output queue, or (B) a virtual output queue corresponding to a uniform probability selection output for a time slot, as a function of queue lengths of the previously served virtual output queues of all of the plurality of input ports and queue lengths of the virtual output queue corresponding to the uniform probability selection output, for all of the plurality of input ports includes
  1) tracking, for each input port, a queue length of a set of one or more virtual output queues having a corresponding non-empty crosspoint buffer that was served in the last time slot,
  2) setting a first variable to a sum of the queue lengths tracked of the set of one or more virtual output queues if there is at least one virtual output queue having a corresponding non-empty crosspoint buffer that was served in the last time slot, otherwise setting the first variable to zero,
  3) determining a uniform probability selection output for each time slot,
  4) determining, for each input port, a queue length of a virtual output queue corresponding to the uniform probability selection output for the time slot,
  5) determining, for each input port, a difference value between the first variable and the queue length of the virtual output queue corresponding to the uniform probability selection output for the time slot,
  6) determining a binary value using a sum of the difference values determined by all of the input ports, and
  7) selecting, for each input port, either (A) the previously served virtual output queue, or (B) the virtual output queue corresponding to the uniform probability selection output for the time slot based on the determined binary value.

* * * * *